(12) United States Patent
Walters et al.

(10) Patent No.: US 8,787,008 B2
(45) Date of Patent: Jul. 22, 2014

(54) ELECTRONIC DEVICE WITH AT LEAST ONE EXTENDABLE DISPLAY SECTION

(71) Applicant: Creator Technology B.V., Breda (NL)

(72) Inventors: Michael Johannes Anna Maria Walters, Eindhoven (NL); Robèrt van Dijk, Eindhoven (NL); Volker Barnhart Verschoor, Eindhoven (NL); Petrus Johannes Gerardus van Lieshout, Beek en Donk (NL); Rik Kruidhof, Enschede (NL)

(73) Assignee: Creator Technology B.V., Breda (NL)

( * ) Notice: Subject to any disclaimer, the term of this patent is extended or adjusted under 35 U.S.C. 154(b) by 0 days.

(21) Appl. No.: 13/740,135

(22) Filed: Jan. 11, 2013

(65) Prior Publication Data

US 2013/0128439 A1    May 23, 2013

Related U.S. Application Data

(62) Division of application No. 12/690,708, filed on Jan. 20, 2010, now Pat. No. 8,379,377.

(51) Int. Cl.
*G06F 1/16* (2006.01)

(52) U.S. Cl.
USPC ............ 361/679.21; 361/679.04; 361/679.05; 312/223.1; 312/223.2; 248/917

(58) Field of Classification Search
None
See application file for complete search history.

(56) References Cited

U.S. PATENT DOCUMENTS

| | | | |
|---|---|---|---|
| 5,768,096 A * | 6/1998 | Williams et al. | 361/679.04 |
| 6,016,176 A * | 1/2000 | Kim et al. | 349/84 |
| 7,752,789 B2 * | 7/2010 | Sun et al. | 40/491 |
| 8,018,715 B2 * | 9/2011 | Chang | 361/679.04 |
| 8,369,075 B2 * | 2/2013 | Huang | 361/679.21 |
| 2006/0082518 A1 * | 4/2006 | Ram | 345/1.1 |
| 2006/0192726 A1 * | 8/2006 | Huitema et al. | 345/1.1 |
| 2006/0238500 A1 | 10/2006 | Olshansky et al. | |
| 2006/0268500 A1 | 11/2006 | Kuhn | |
| 2007/0247798 A1 * | 10/2007 | Scott | 361/683 |
| 2008/0158795 A1 * | 7/2008 | Aoki et al. | 361/681 |
| 2010/0037428 A1 * | 2/2010 | Gaddy | 16/223 |

* cited by examiner

*Primary Examiner* — Anthony Q Edwards

(57) ABSTRACT

An electronic device (1) is described that comprises a flexible display (9) with at least two extendable display sections (6,7), each display section being movable to an extended position and supported by an associated hold out mechanism (3,4). The electronic device comprises a further display section (9*a*) and a main body (2), with a window area (5) supporting part of the display (9), in the extended position. The display sections (6,7) extend outwardly from the main body (2) from different sides of the window area (5) and form one continuous wide screen display panel (9) with the further section (9*a*).

3 Claims, 10 Drawing Sheets

ELECTRONIC DEVICE WITH AT LEAST ONE EXTENDABLE DISPLAY SECTION

This application is a divisional of U.S. application Ser. No. 12/690,708, filed Jan. 20, 2010 and entitled "ELECTRONIC DEVICE WITH AT LEAST ONE EXTENDABLE DISPLAY SECTION," the entire disclosure of which is hereby incorporated by reference.

FIELD OF INVENTION

The invention relates to an electronic device with at least one extendable display section.

BACKGROUND

The present invention relates to the field of electronic devices with a flexible display. Presently flexible displays can be made with a curvature radius in the range of 5 to 10 mm thus providing a rollable or wrappable display. This makes it possible to store a flexible display or part of it in a compact space, for instance for transportation or when otherwise not needed. A typical use of these displays is in mobile products. Any such display integrated into a device will need to be supported by an extension mechanism when rolled or folded out, to ensure flatness or even tautness and protection of the display.

The flexible displays in electronic devices of the kind disclosed in WO 2006-126158 A1 normally have two modes of use. The first is a compact mode, which can be used for transportation and summarized information viewing (for instance as a preview screen). The second mode is a maximum mode, which can be used for extensive reading/viewing of the large display. When using a wide screen or large (≥7-inch) flexible display a large stroke needs to be initiated to switch between the two positions. The mechanisms required for this quickly become either very large (in closed state) or have little rigidity (in open state).

SUMMARY OF THE INVENTION

In accordance with embodiments of the present invention a wide screen flexible display is used in an electronic device with a compact closed state and one or more open states in which an end position is fixed and at least part of the display is flat.

According to one aspect, the exemplary embodiments provide an electronic device comprising a display with at least one extendable display section and a further display section. The electronic device also includes a main body including a body area supporting part of the display, electronics of the device, and electrical and mechanical connections of the display. Moreover, a hold out mechanism is provided that supports the extendable display section. The display is movable with respect to the main body between a normal position, where the display is fully located in or adjacent to the body, and an extended position, where the extendable display section extends outwardly from the body area. In the extended position the extendable display section is supported by the hold out mechanism.

Furthermore, the display includes at least two extendable sections. Each of the extendable sections is movable to an extended position and supported by an associated hold out mechanism. The respective extendable sections extend outwardly from the main body from different sides of the body area and form one continuous display panel with the further display section.

According to another aspect, the described exemplary embodiments provide an electronic device comprising a flexible display with at least one extendable display section and a further display section. The electronic device also includes a main body including a body area supporting part of the display, electronics of the device, and electrical and mechanical connections of the display. Moreover, the devices in accordance with illustrative embodiments include a hold out mechanism for supporting the extended part of the extendable display section. Moreover, the display is movable with respect to the main body between a normal position, where the display is fully located in or adjacent to the body, and an extended position, where the extended part of the extendable display section extends outwardly from the body area, supported by the hold out mechanism. The extendable display section and the further display section are supported by two parts of the main body that are pivotally connected between an open and closed position of the display. In the open position the extendable display section, with its extended part, and the further display section together form one continuous display panel.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1A:
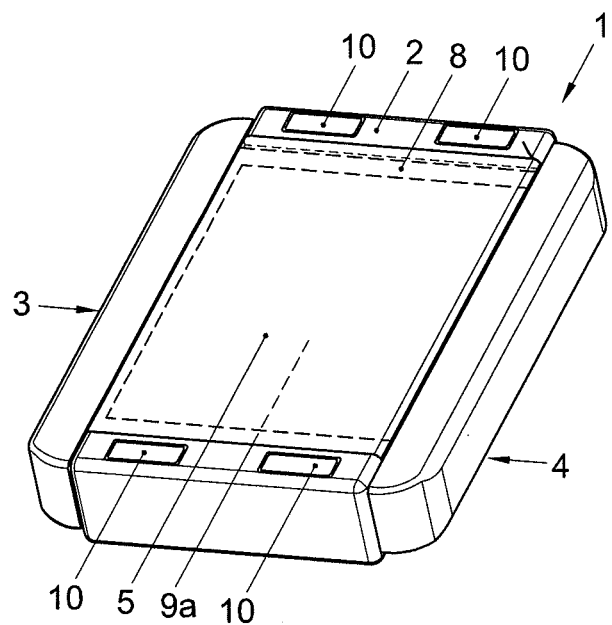
FIGS. 1a, 1b and 1c are perspective views of an electronic device with a flexible display according to an exemplary first embodiment comprising two roll mechanisms in a closed position (FIG. 1a), a half open position (FIG. 1b) and a fully open (wide screen) position (FIG. 1c)
Figure 1B:
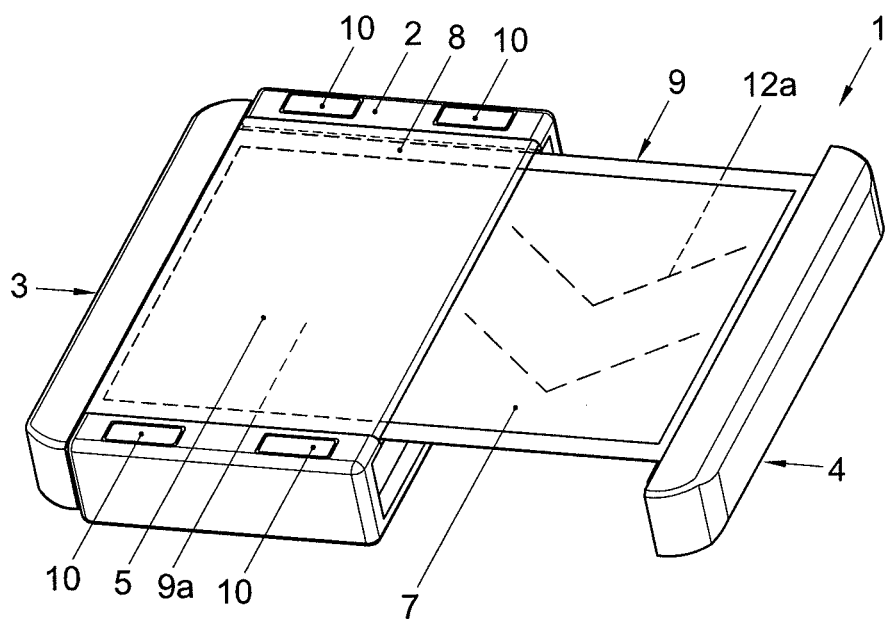
Figure 1C:
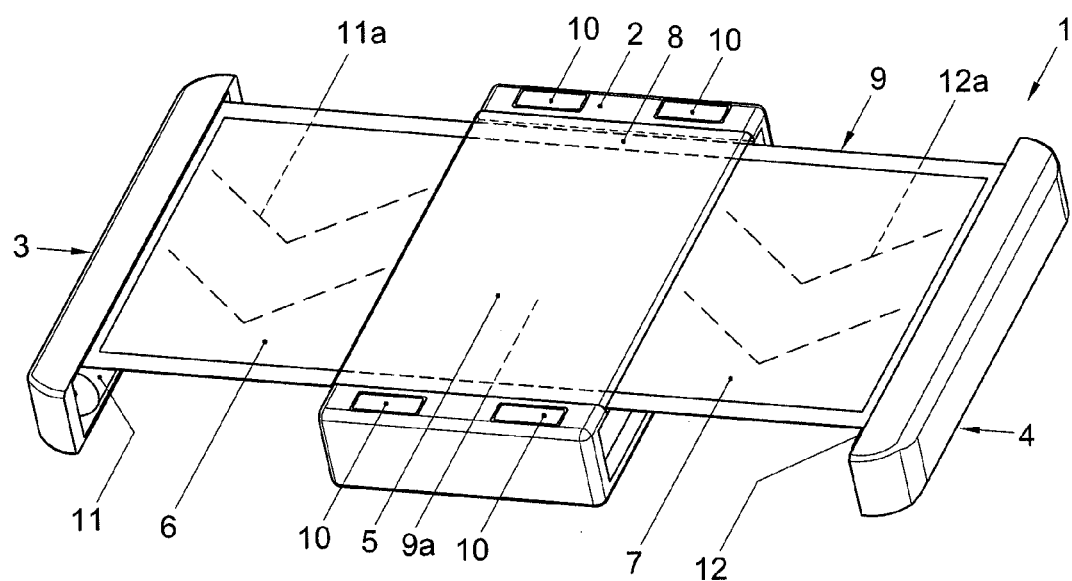
Figure 2:
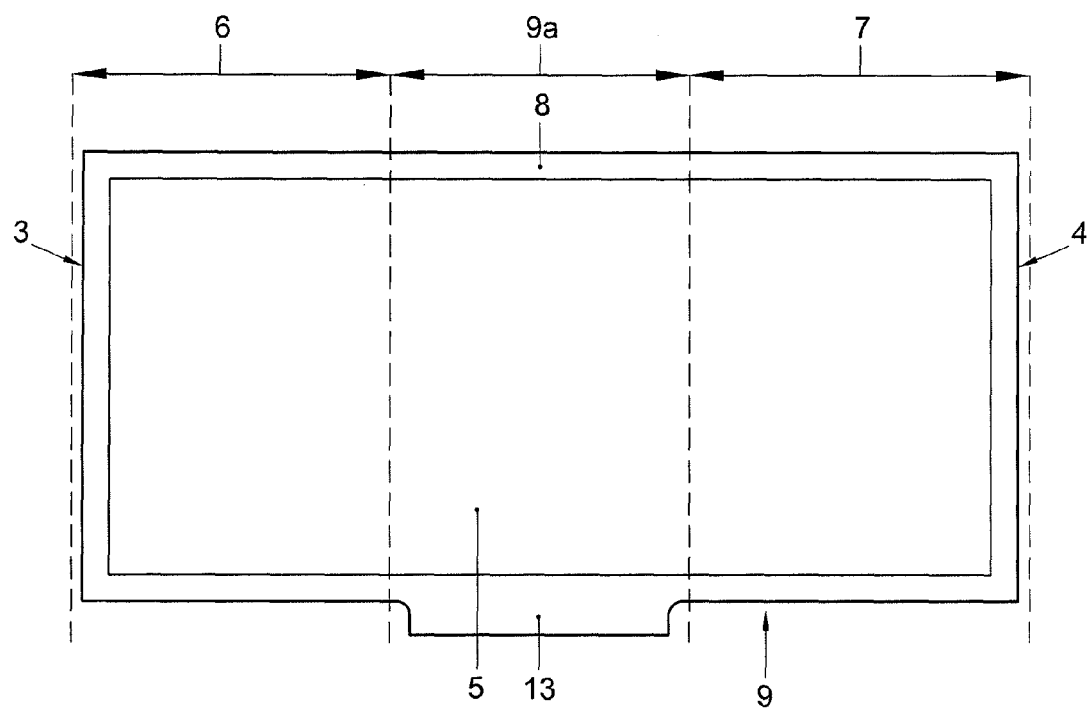
FIG. 2 is a schematic top view of the device in accordance with FIG. 1 in the fully open (wide screen) position (FIG. 1c)

As shown in FIGS. 1 and 2, in accordance with illustrative embodiments an electronic device 1 with a main body 2 is positioned between two hold-out mechanisms 3, 4, which may be combinations of roll, slide and/or wrap principles, on each side of the device. In the first embodiment the hold-out mechanisms are shown as roll mechanisms 11, 12 on each side of the body 2. The main body 2 includes a transparent front cover 5 with a window area. Extendable display sections 6, 7 supported by the roll mechanisms 11, 12 of the hold-out mechanisms 3, 4 and a further display section 9a supported at the window area 8 together form one continuous display panel 9.

The main body 2 forms a housing for electronics of the device. It supports the display and is used for those parts of the display which have no or limited flexibility, such as the display drivers and display connections 13. The main body 2 has a rigid area with user interface buttons 10.

Since each mechanism 3, 4 needs to support only part of the display panel, it can be made compact and stiff. In the closed position (FIG. 1a) the device is small enough for compact transportation. In the open position (FIG. 1c) the hold-out mechanisms are fixed by fixing members 11a, 12a and the display panel with the display sections 6, 7 together with the display section at the window area 8 is flat in a full wide-screen or large display application. It is noted that the two hold-out mechanisms may operate separate from each other, but it may be advantageous to have them operating synchronously.

Figure 3A:
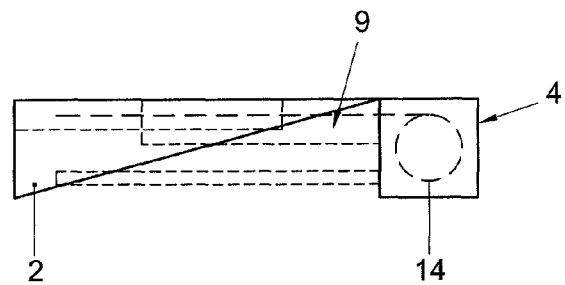
FIGS. 3a, 3b and 3c are schematic side views of a device with a flexible display in a second embodiment, comprising a roll and a slide mechanism in the three positions of FIG. 1a, FIG. 1b, and FIG. 1c.
Figure 3B:
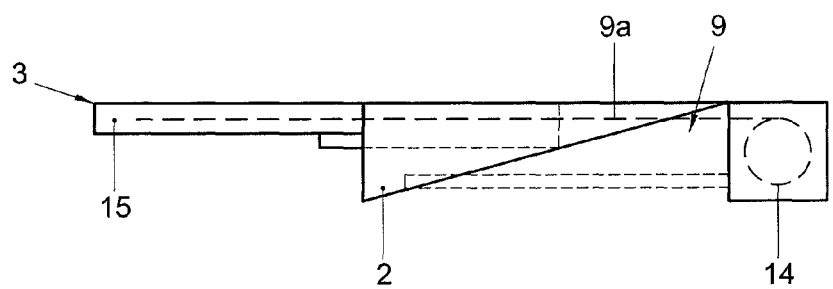
Figure 3C:
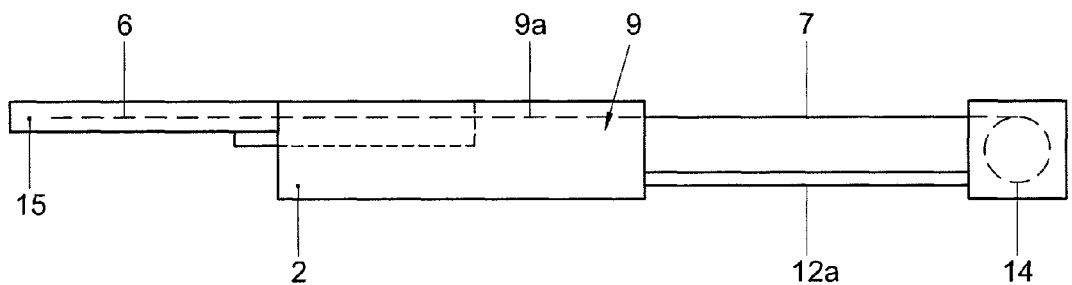
Figure 4:
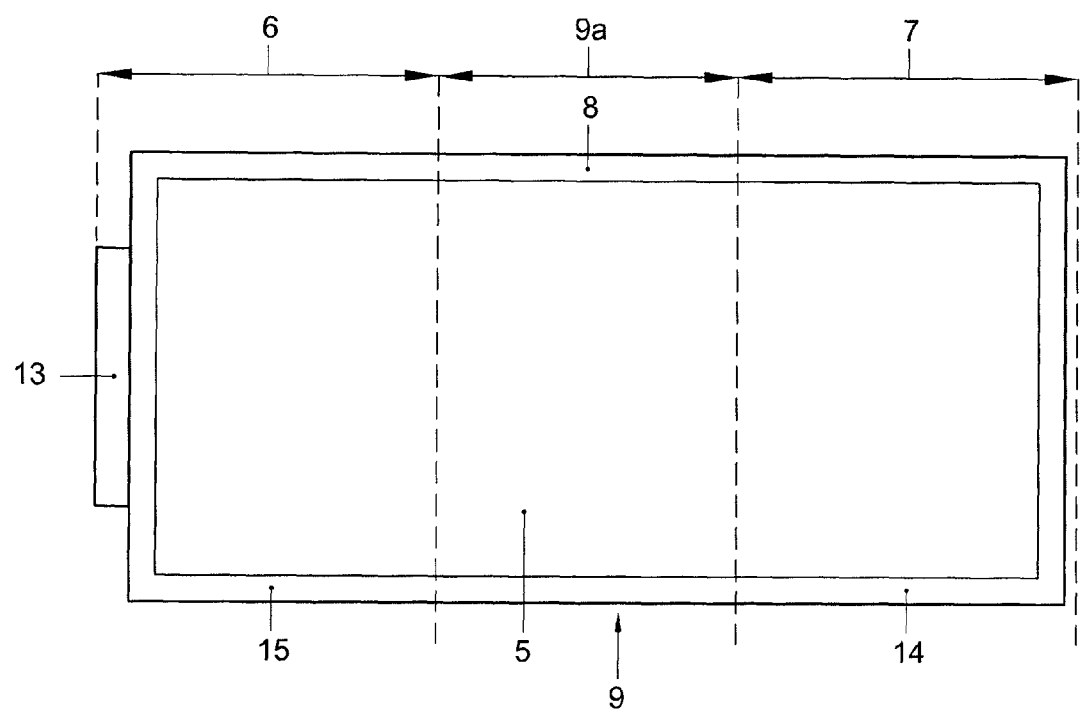
FIG. 4 is a schematic top view of the device in accordance with FIG. 3c in the fully open (wide screen) position.

The second embodiment shown in FIG. 3 and FIG. 4 is a variation of the first embodiment. The hold out mechanisms 3, 4 now consist of a roll mechanism 14 and a slide mechanism 15 on each side of the main body. (See, FIGS. 3a, 3b and 3c for the three user states of the device). From the closed position of FIG. 3a the slide mechanism 15 moves outwardly and moves the continuous display panel 9 through the window area 8 and possibly below the front cover 5 to the half open position (FIG. 3b) in which the further display section 9a is located in the window area. In the full open position (FIG. 3c) the roll mechanism 14 has been moved outwardly as well and the slide and roll mechanism are locked and the display panel 9 with the display sections 6, 7 together with the display section at the window area 8 is flat in a full wide-screen large display application. In the area of the slide mechanism 15 and the main body 2, the display 9 is supported, and in the slide area the side of the display is non-flexible and fixed and therefore can house the limited or non-flexible parts of the device and display, such as the display drivers and display connections 13. It is noted that the two hold-out mechanisms may operate separate from each other, but it may be advantageous to have them operating synchronously.

Figure 5A:
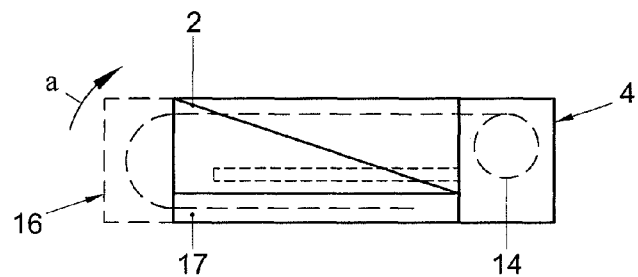
FIGS. 5a, 5b and 5c are schematic side views of a device with a flexible display in a third embodiment, comprising a roll and a wrap mechanism with the display in the three positions of FIGS. 1a, 1b and 1c.
Figure 5B:
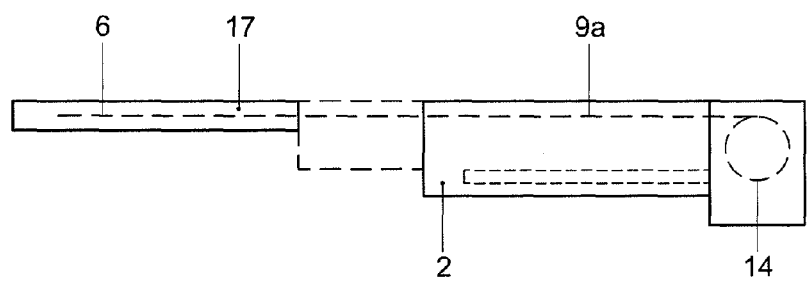
Figure 5C:
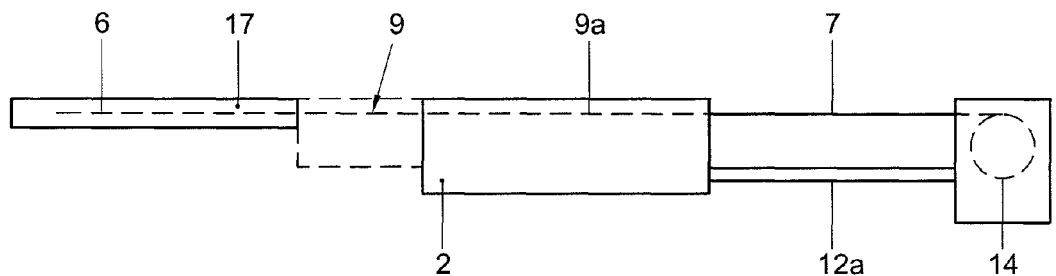
Figure 6:
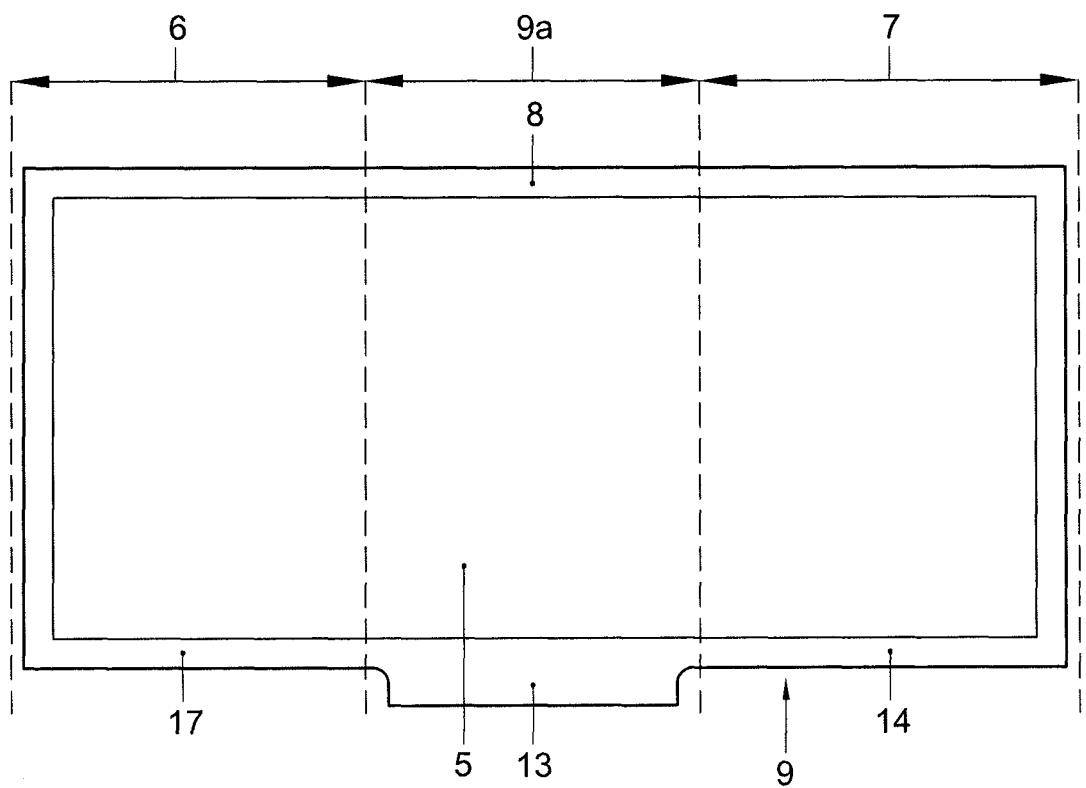
FIG. 6 is a schematic top view of the device in accordance with FIG. 5c displaying the device in the fully open (wide screen) position.

The third embodiment shown in FIGS. 5 and 6 is a variation of the first and second embodiments. The hold out mechanism 3, 4 is now made of a roll mechanism 14 and a wrap mechanism 16 on each side of the main body 2. See, FIGS. 5a, 5b and 5c for the three user states of the device. In the wrap area and body area the display can be supported, and in the body area the display is fixed and therefore can house the limited or non-flexible parts of the device and display, such as the display drivers and display connections 13.

A wrap mechanism of the kind of wrap mechanism 16 is described in more detail in publication WO 2006/085271, published Aug. 17, 2006 which is expressly incorporated in this application by reference in its entirety. It is noted that the two hold-out mechanisms may operate separate from each other, but it may be advantageous to have them operating synchronously.

From the closed position of FIG. 5a the wrap mechanism 16 moves outwardly by moving wrap part 17 in direction of the arrow "a" to the half open position of FIG. 5b. In the full open position (FIG. 5c) the roll mechanism 14 has been moved outwardly as well and the wrap and roll mechanism are locked and the display panel 9 with the display sections 6, 7 together with the display section 9a at the window area 8 is flat in a full wide-screen or large display application. The display 9 is supported in the area of the wrap mechanism 16 and the main body 2. In the main body 2 area the display is fixed and therefore can house the limited or non-flexible parts of the device and display such as the display drivers and display connections 13.

Figure 7A:
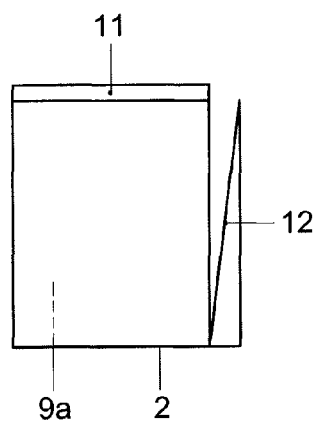
FIGS. 7a and 7b are schematic top views of a device with a flexible display in a fourth embodiment, comprising two roll mechanisms mounted in directions perpendicular to each other in a closed position (FIG. 7a) and fully open (wide screen) position (FIG. 7b)
Figure 7B:
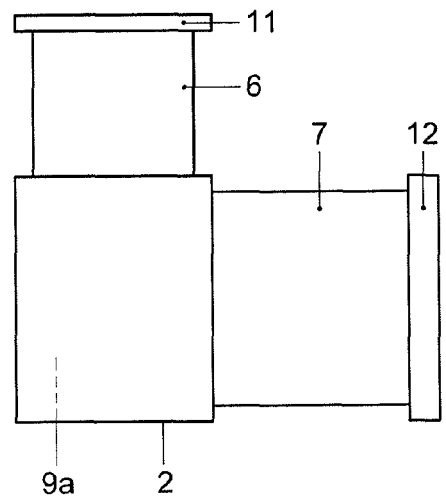

In the fourth embodiment shown in FIG. 7 the extension mechanisms of the device are as the roll mechanisms 11, 12 of FIG. 1, but are mounted to the main body 2 in directions perpendicular to each other, creating an L-shaped device when moved from the closed position of FIG. 7a to the fully opened position of FIG. 7b. Such a device orientation would also allow for different modes of use, where different display orientations are required. For example, internet browsing or watching video could benefit from a landscape orientation on such a device, whereas a portrait orientation might be more suitable for reading applications. It is noted that the two hold-out mechanisms may operate separate from each other, but it may be advantageous to have them operating synchronously.

Figure 8A:
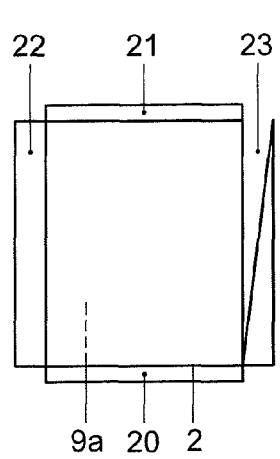
FIGS. 8a and 8b are schematic top views of a device with a flexible display in a fifth embodiment comprising two pairs of roll mechanisms mounted in directions perpendicular to each other in a closed position (FIG. 8a) and fully open (wide screen) position (FIG. 8b) position.
Figure 8B:
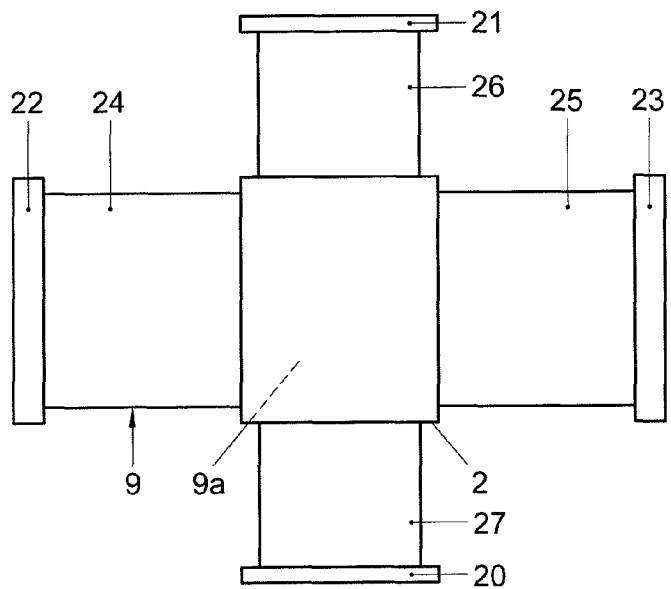

The fifth embodiment of the device, shown in FIG. 8a in the closed position and in FIG. 8b in the fully open position, is the same as the first, second, third and fourth embodiments, but with more than two extension mechanisms. Each pair of extension mechanisms (20, 21; 22, 23) and each pair of extendable display sections (24, 25; 26, 27) extend in line, while the two pairs of mechanisms and display sections extend perpendicular to each other. The extension mechanisms may be roll mechanisms, like in the first embodiment, but also a mix of slide or wrap with roll mechanisms is possible. Such implementations could be useful in laptop implementations, where much larger screens are required while keeping the device size relatively small. It is noted that the two hold-out mechanisms may operate separately from each other, but it may be advantageous to have them operating synchronously.

In the sixth embodiment of the device 1, including a main body 28 shown in FIG. 9, the hold out mechanism 3 comprises a roll mechanism 29. This device comprises a flexible display 9 with an extendable display section 6 and a further display section 9a. Further, the device comprises four parts: two main body parts 28a, 28b that are pivotally connected by a hinge 28c and form a book-part and support the display sections 6 and 9a, with at the side of body part 28b opposite of the display section 6; a keyboard 30 that is pivotally connected to part 28b by a hinge 28d; and on the other side a sliding part 31 that rolls out the display section 6 with its extended part 6a from the roll mechanism 29. The body parts 28a, 28b include electronics of the device and with electrical and mechanical connections of the display.

Figure 9A:
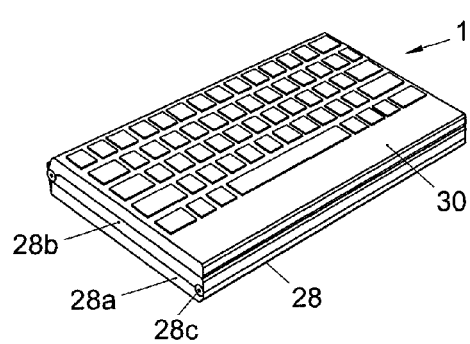
FIGS. 9a, 9b, 9c, 9d and 9e are perspective views of a device with a flexible display in a sixth embodiment, comprising a roll mechanism and a pivotable keyboard in a closed configuration (FIG. 9a), a preview configuration (FIG. 9b), a book configuration (FIG. 9c), a fully opened configuration (wide screen) (FIG. 9d), and a completely and fully opened (wide screen) configuration (FIG. 9e)
Figure 9B:
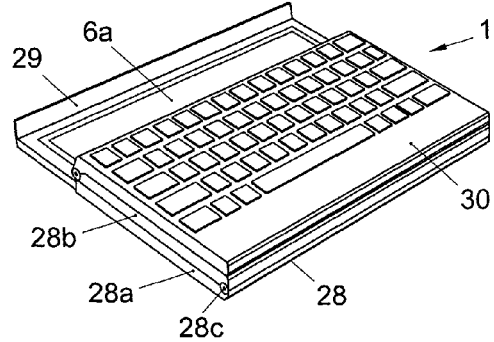
Figure 9C:
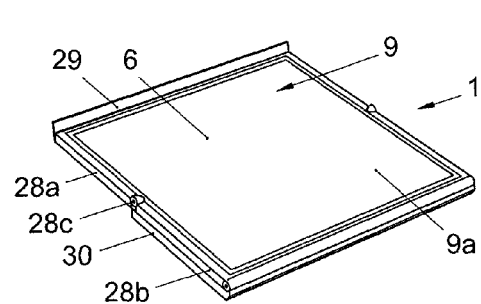
Figure 9D:
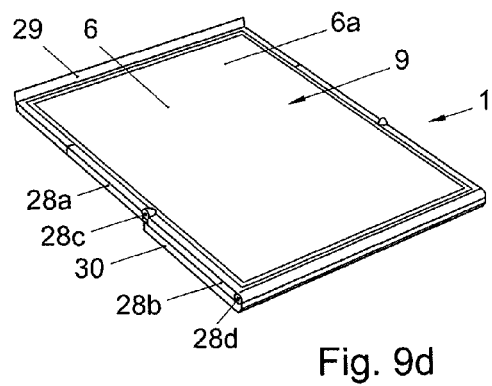
Figure 9E:
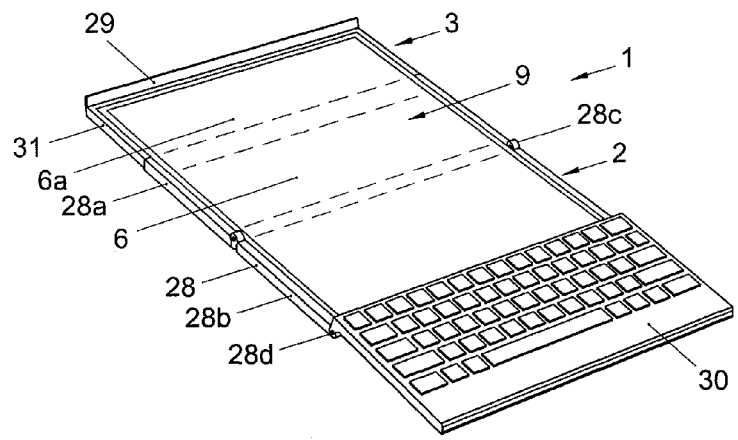

In addition to a closed position of the display shown in FIG. 9a, the illustrative device has four different operating modes, shown in FIGS. 9b, 9c, 9d and 9e. FIG. 9b shows a preview configuration of the display. This position differs from the closed position of FIG. 9a, since only the extended part 6a is opened and now the keyboard 30 is ready for use. In FIG. 9c only the book part is opened. In FIGS. 9d and 9e, the open position of the display is shown. In this extendable position the extendable display section 6 with its extended part 6a and the further display section 9a together form one continuous display panel that is flat in a full wide-screen or large display application. In this embodiment the keyboard 30 is pivotable from the inoperative position of FIG. 9d, in which the keyboard is located neighboring the back side of the main body 28 to the operative position shown in FIG. 9e. The keyboard is activated by a controller in the device in situations where it is in a usable position with respect to the screen, such as shown in FIG. 9b and FIG. 9e, and disabled in other situations.

Figure 10:
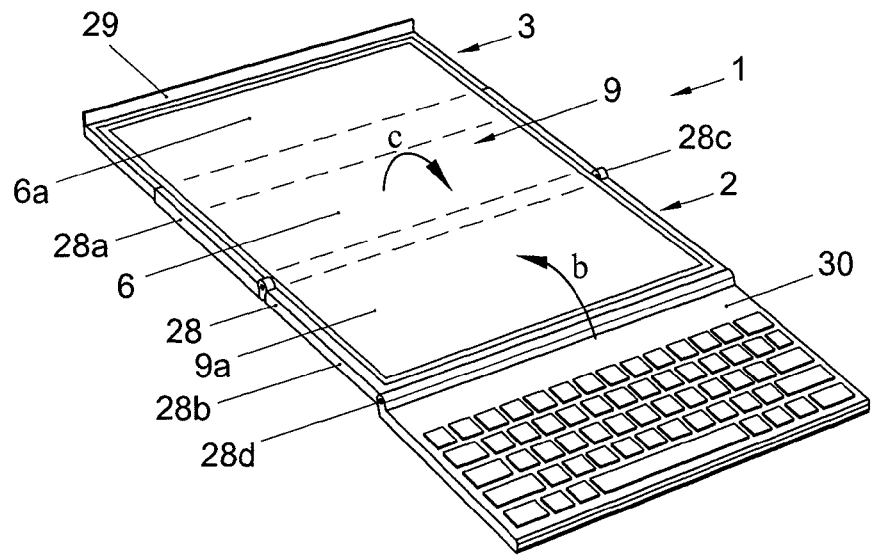
FIG. 10 is a perspective overview of the device in accordance with FIGS. 9a-e, but with the keyboard pivotable inwardly with respect to the flexible display in the completely and fully opened (wide screen) configuration.

Another embodiment of the device 1, shown in FIG. 10, uses a keyboard 30 that pivots inwards in the direction of arrow "b" from the operative position of FIG. 10 to the inoperative position, positioning it after pivoting the body parts 28a, 28b in the direction of arrow "c" in between the two parts 28a, 28b and the display sections 6, 9a in the collapsed situation. This results in a wrap-and-slide solution. The display sections 6 and 9a have the same configuration as in the embodiment of FIG. 9. The advantage of this solution is that in a closed inoperative state the keyboard 30 is protected between the two parts 28a, 28b and therefore can not be accidentally activated from the outside.

Figure 11:
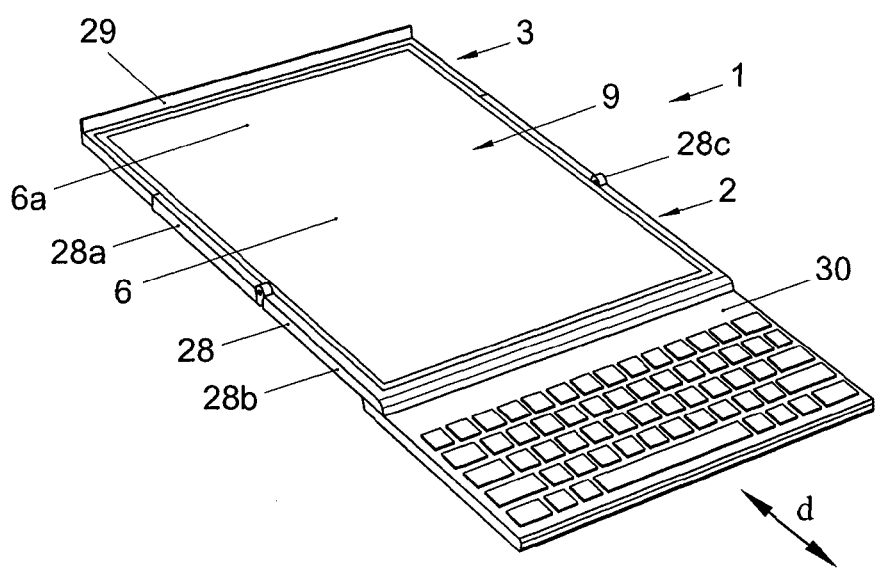
FIG. 11 is a perspective overview of the device in accordance with FIGS. 9a-e, but with the keyboard slidable with respect to the flexible display.

Yet another embodiment, shown in FIG. 11, uses a sliding keyboard 30 instead of a pivotally attached keyboard. The keyboard is slidably connected with the underside of the body part 28b in a direction parallel with the bodypart (arrow d) The advantage of the solution in this embodiment is that in a closed state the keyboard 30 is protected under the body part 28b and therefore can not be accidentally activated from the outside. The display sections 6 and 9a have a same configuration as in the embodiment of FIGS. 9 and 10.

The advantage of the device 1 in the embodiment of FIGS. 9, 10 and 11 is that a larger factor between the size of a mobile device and the size of the display is reached without the need for a large volume and complexity of the mechanical parts. This enables a much larger variety of applications for the device 1 than with similarly sized devices with smaller displays. Also, the proposed device concepts can be nicely combined with a good size keyboard in several ways. Another advantage of the device 1 in the embodiment of FIGS. 9, 10 and 11 is the presence of a preview configuration, as shown in FIG. 9b. The embodiment of FIG. 9 offers the added advantage of having an operable keyboard in the preview configuration, as shown in FIG. 9b.

Alternatively these embodiments include the two extension mechanisms 6, 7 of the device shown in FIG. 7 forming together, with the further display section 9a, one continuous L-shaped display panel when moved from the closed position to the fully opened position.

In the different embodiments the display panel 9 at the area of the front cover 5 or parts of the display panel or the whole display itself can be used as a touch screen for user interface purposes. In all embodiments in every position and mode of use the display is operated by a visible touch-sensitive area. This allows multiple user interface scenarios depending on which mode of use the user has chosen. The display that is supported in the body area or when using embodiment 2 or 6 also in the slide area and embodiment 3 in the wrap area makes it possible to use touch sensitivity in several ways; either integrated in the display itself, by using a flexible or rigid front cover or by implementing a touch sensitive area beneath the display.

The advantages of the device 1 in accordance with the illustrative embodiments give users the opportunity to use the device in three or more different states. A large wide screen display can be implemented (display ≥7 inches) while still keeping the device portable like a mobile phone. Having the main body 2 in the middle of the device provides support for the display and other rigid parts (including user interface, touch screen, display drivers, display flexes and hold out mechanisms) can be implemented here, resulting in a more rigid device.

The detailed drawings, specific examples and particular formulations given, serve the purpose of illustration only. Furthermore, other substitutions, modifications, changes, and omissions may be made in the design, operating conditions, and arrangement of the exemplary embodiments without departing from the scope of the invention as expressed in the appended claims.

What is claimed is:

1. An electronic device comprising:
a flexible display with at least one extendable display section and a further display section;
a main body including a body area supporting part of the display, electronics of the device, and electrical and mechanical connections of the display;
a hold out mechanism for supporting the extended part of the extendable display section; the display being movable with respect to the main body between: a normal position, where the display is fully located in the body, and an extended position, where the extended part of the extendable display section extends outwardly from the body area, supported by the hold out mechanism, wherein the extendable display section and the further display section are supported by two parts of the main body that are pivotally connected between an open and closed position of the display; and wherein in the open position the extendable display section with its extended part and the further display section together form one continuous display panel.

2. The electronic device in accordance with claim 1, wherein a keyboard is connected with the main body near the side opposite the extendable display section, the keyboard being movable by pivoting or sliding with respect to the main body between an inoperative and an operative position.

3. The electronic device in accordance with claim 2, wherein in the inoperative position the keyboard is located neighboring the back side of the main body.

* * * * *